United States Patent
Ide et al.

(10) Patent No.: US 7,529,991 B2
(45) Date of Patent: May 5, 2009

(54) SCORING METHOD FOR CORRELATION ANOMALIES

(75) Inventors: Tsuyoshi Ide, Kawasaki (JP); Shoko Suzuki, Yamato (JP)

(73) Assignee: International Business Machines Corporation, Armonk, NY (US)

(*) Notice: Subject to any disclaimer, the term of this patent is extended or adjusted under 35 U.S.C. 154(b) by 276 days.

(21) Appl. No.: 11/668,745

(22) Filed: Jan. 30, 2007

(65) Prior Publication Data

US 2008/0183423 A1    Jul. 31, 2008

(51) Int. Cl.
*G01R 31/28* (2006.01)

(52) U.S. Cl. .................. 714/724; 702/180

(58) Field of Classification Search ............... 703/2; 701/44; 705/35; 714/714; 702/180
See application file for complete search history.

(56) References Cited

U.S. PATENT DOCUMENTS

2006/0015430 A1* 1/2006 Megale et al. ............... 705/35
2006/0161403 A1* 7/2006 Jiang et al. ................... 703/2
2007/0088448 A1* 4/2007 Mylaraswamy et al. ...... 700/44
2007/0294156 A1* 12/2007 Hughes et al. ............ 705/36 R

* cited by examiner

*Primary Examiner*—David Ton
(74) *Attorney, Agent, or Firm*—Cantor Colburn LLP; Casey August

(57) ABSTRACT

Within aspects of the present invention, correlation anomalies are calculated in four stages for a reference data set, and a target data set, respectively, the four stages are: Initially, a similarity matrix K of the variables to be diagnosed is calculated. This similarity matrix is embedded in a low-dimensional vector space in order to calculate and obtain the coordinates $\{z_1, \ldots z_p\}$ for each variable. Next, an energy value $\{e_1, \ldots e_p\}$ is calculated per variable from calculated coordinates. Lastly, a comparison is made of the energy values that have been calculated for the target data set with the energy values of that have been calculated for the reference data set in order to determine the degree of correlation anomalies that has occurred between the two data sets.

5 Claims, 2 Drawing Sheets

SCORING METHOD FOR CORRELATION ANOMALIES

BACKGROUND OF THE INVENTION

1. Field of the Invention

This invention relates to systems and methodologies for implementing fault analysis systems, and particularly to systems and methods for determining correlation anomalies of specified variables.

2. Description of Background

Before our invention popular approaches to the performance of correlation analysis usually comprised the utilization of a correlation coefficient or, equivalently, a covariance matrix. In the event that two covariance matrices were calculated from differently tagged data sets, the problem of correlation analysis was reduced to the comparison between two p-dimensional normal distributions, where p is the number of variables involved. Conventionally, several known methods exist to determine whether or not two covariance matrices are statistically identical. However, these methods are applicable only to very static data. These methods, when used for data that takes into consideration the conditions of experimental fluctuations, the implementation of heterogeneities variables, and the diagnostic correlation between variables, an result in misleading answers.

In addition, if it has been determined that there is a significant difference between the two covariance matrices in one way or another, then the difference itself will not provide enough data for practical use. Because the information that is needed to facilitate a sufficient failure analysis determination is the information pertaining to which variable is abnormal. The use of this abnormal variable information is an essential element for an analysis tool to utilize in determining a course action that is to be taken in regard to a subject matter. If such actionable information is not provided, the analysis tool will be useless. For similar reasons, methodologies with which to calculate and visualize, or rank the difference between a normal correlation matrix and an abnormal correlation, have usability problems. Thus, traditional correlation coefficient analysis tools do not provide sufficient solutions.

Therefore, there exists a need for a method to identify anomalies for variables that have been calculated from correlation matrices that are based upon information that pertains to respective pairings of variables.

SUMMARY OF THE INVENTION

The shortcomings of the prior art are overcome, and additional advantages are provided through the provision of a system for the calculation of variable correlation anomalies based upon multiple correlation variables, the system further comprising a data import component, wherein the data import component is configured to receive target data files, reference data files, and variable definition data files. The system further comprises a data parsing component, wherein the data parser component is configured to parse target input data that is retrieved from a target input data file, and reference input data that is retrieved from a reference input data file, a variable definition parser component, wherein the variable definition parser component is configured to parse variable definition input data that is retrieved from a variable input data file.

Yet further, the system comprises a data analysis engine, wherein the data analysis engine is configured to perform the steps of calculating a similarity matrix for a set of variables for the reference input data and the target input data, mapping the similarity matrices to a low-dimensional vector space in order to calculate a coordinate value for each variable that is comprised within a reference input data matrix and the target input data matrix. The data analysis engine is further configured to perform the steps of calculating an energy value per variable for each coordinate calculated value comprised within the reference input data matrix and the target input data matrix, comparing the calculated energy values derived from the reference input value matrix and the target input value matrix in order to determine the degree of anomalies between the respective energy values.

The system additionally comprises the steps of generating a resultant diagnostic analysis file, wherein the file comprises information in regard to the resultant degree of correlation anomalies that exist between the target input value matrix and the reference input value matrix, and a visualization component, wherein the visualization component generates a histogram, the histogram providing visual details in regard to the determined degree of anomalies between the respective energy values.

Methods corresponding to the above-summarized system are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

One or more exemplary embodiments of the invention are described below in detail. The disclosed embodiments are intended to be illustrated only since numerous modifications and variations therein will be apparent to those of ordinary skill in the art.

Aspects of the present invention can be implemented within a conventional computing system environment comprising hardware and software elements. Specifically, the methodologies of the present invention can be implemented to program a computer to accomplish the prescribed tasks of the present invention as described below.

Figure 1:
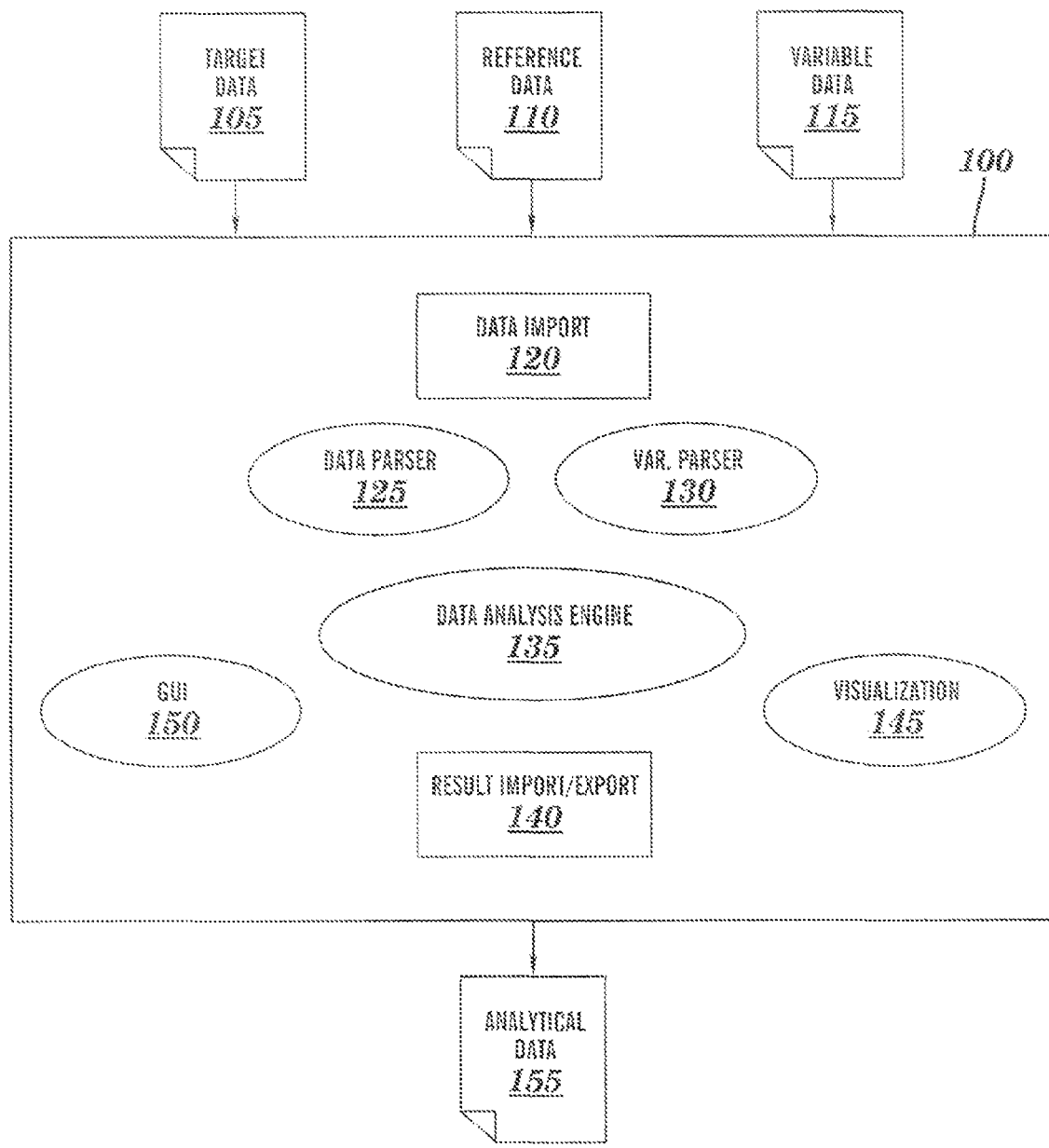
FIG. 1 illustrates one example of a block diagram detailing aspects of a configuration of an analysis system.

Turning now to the drawings in greater detail, it will be seen that in FIG. 1 there is a block diagram detailing software elements 100 that may be comprised within aspects of embodiments of the present invention. The software elements 100 of the programmed computer include a data import component 120, a data parsing component 125, a variable definition parser component 130, data analysis engine 135, a results importing/exporting component 140, visualization component 145, and a GUI 150.

Within aspects of the present invention, correlation anomalies are calculated in four states for a specified reference data set, and a target data set. Respectively, the four stages are: Calculating a similarity matrix K of the variables that are to be diagnosed. This similarity matrix is then embedded in a low-dimensional vector space in order to calculate and obtain the coordinates $\{z_1, \ldots z_p\}$ for each variable. Next, an energy value $\{e_1, \ldots e_p\}$ is calculated per variable from the calculated coordinates. Lastly, a comparison is made of the energy values that have been calculated for the target data set with the energy values that have been calculated for the reference data set, in order to determine the degree of correlation anomalies that has occurred between the two data sets.

Definition of Similarity Matrices

Within aspects of the present invention, the similarity among the p-dimensional variables can be calculated from the data set by use of a variety of techniques. The i-th component of $x^{(s)}$ is represented as $x_i^{(x)}$ with respect to $s \in \{1, 2, \ldots 7\}$, and the similarity between the i component and j component is represented as $a_{i,j}$. This similarity in the multivariate system that handles real number is described as a correlation coefficient.

$$a_{i,j} \equiv \langle x_i x_j \rangle$$

Here $\langle x_i x_j \rangle$ is defined as follows:

$$\langle x_i x_j \rangle \equiv \frac{1}{T} \sum_{s=1}^{T} x_i^{(s)} x_j^{(s)} \qquad \text{Equation 1}$$

In short, it is the average of the empirical distribution.

For the simplification of description, we assume that the equations, $\langle x_i \rangle = 0$ and $\langle x_i^2 \rangle = 1$, hold with respect to discretionary i. The matrix have $a_{i,j}$ as the (i, j) component is represented as K, and it is referred to as a similarity matrix. The reason why the correlation coefficient can be regarded as a similarity is that it shows the degree of correlation of two variables. An important precondition within aspects of the present invention is that other alternatives can serve as K other than the correlation coefficient matrix as described. The normal correlation coefficient only shows simple correlation, typically referred to as linear correlation, but when you use on of the generalized correlation matrices, the following can hold:

$$a_{ij} \equiv \langle x_i^2 x_j^2 \rangle - \langle x_i^2 \rangle \langle x_j^2 \rangle - 2 \langle x_i x_j \rangle^2 \qquad \text{Equation 2}$$

Based on Equation 2, nonlinear correlation could be incorporated as a similarity of a kind into the theory.

However, if such a nonlinear correlation is discretionarily selected, such good properties, as the positive definite values that the normal correlation coefficient matrices have, may be lost. It is assumed herein that the definition of similarity is given from the outside, and, mathematically, no other assumption is made, excluding that K is a real matrix.

Embedding of the Matrices in Low-Dimensional Space

Next, the coordinates $\{z_1, \ldots z_p\}$ of each variable r(<p, T)-dimensional space are calculated. There are two reasons for doing this. First, it is required that the correlation between variables is recognized as quantitative distance. Secondly, it is required that the noise component contained in the variable data be removed by embedding the variables in the low-dimensional space.

In the sense that the distance is defined, there is a good method for giving a function $f: a_{ij} \rightarrow d_{ij}$ to the similarity $a_{ij}$ given in the previous section. When this method is used, the distance between variables can be directly obtained, and the calculations can proceed to the third stage. On the other hand, dimension reduction by the principal component analysis in view of noise removal is one of the most natural ways to be applied. A method for calculating the low-rank approximation of correlation matrices and the coordinates at the same time is commonly referred to as multidimensional scaling (MDS).

The present invention uses kernel MDS in order to achieve the above-mentioned objectives. IN summary, the calculations comprise the operations of: calculating the centering inner product matrix B from the similarity matrix K; analyzing the eigen-value of B is, and calculating the r eigen-vectors $u^{(1)}, \ldots, u^{(r)}$ (as column vectors) in descending order from the largest eigen-value. However, each eigen-vector needs to be normalized to the square root of the eigen-value; ;and the p-columns×r-rows: Q=the j-the element of the i-th column of $[u^{(1)}, \ldots, u^{(r)}]$ is assumed to be the j-th element of $z_i$.

Here, B is calculated normally with B=HKH. H being referred to as a matrix called centering matrix, and its (i,j) component is defined by the equation below.

$$H_{ij} = \delta_{ij} - (1/p) \qquad \text{Equation 3}$$

If K is not positive definite, then this aspect is also true of B, and, therefore, some pre-processing and post-processing are required. The simplest process is to neglect negative eigen-values of B, so that K remains positive definite. While embedding the variables in a pseudo-Euclidean space in another approach, interpretation of the result can be harder than the simple approach.

A similarity matrix that has been made positive definite is represented as K⁻. When it is assumed that $p_0$ is a given constant number that is p or less (based on the number of the main component to be selected from the viewpoint of PCA) and the $p_1$ is the number of positive eigen-values of B, r is determined by the following equation:

$$r = \min(p_0, p_1) \qquad \text{Equation 4}$$

In this case, it is assumed that the kernel itself is embedded implicitly in the definition of the similarity matrix as follows:

$$a_{ij} = k(x_i, x_j) \qquad \text{Equation 5}$$

Here $k(x_i, x_j)$ represents the inner product between the images $x_i$ and $x_j$ through a kernel mapping. Therefore, if the input K is a generalized correlation coefficient, the relevant kernel can be defined implicitly.

Calculation of Energy Values

The coordinates $\{z_1, \ldots z_p\}$ of each variable show p point set in r-dimensional space. What should be done here i to examine how the situation around each variable has changed. The result of MDS has arbitrariness with respect to the position of the origin and the rigid rotation of all the point sets. Therefore, it is not desirable to directly compare the coordinates between the data to be diagnosed and the reference data. Some contrivance is needed.

For example, if it is assumed that there are four variables now, the change in the situation around the variable $ex_1$ may be worth examining. When relative coordinates with respect to the coordinates $z_1$ are though of, $|z_2-z_1|$ is the biggest change between two variables. However, this change should not be regarded as important because $z_2$ is a variable of which the similarity to $x_1$ is originally low (the distance is long), and, even though there has been some change, that should not affect the whole. On the other hand, the absolute amount of the change in $|z_3-z_1|$ is small, but it is a change in pairs of variables that have closely correlated with one another (the similarity is strong) and therefore, it should be regarded as important.

In order to represent such an aforementioned distinction, it is necessary to think of a way in which each variable is to have the index $e_i$ that represents the information of the other variables. Suppose the set of the variable i' is located far from the set of the variable i. At this time, i and i' do not affect each other. From this fact, it is natural for $e_i$ to be represented as the linear sum of $f(\|z_j - z_i\|)$ s.t. $f(\infty) = 0$.

Thinking of a so-called short-range potential can satisfy these conditions. Assume that $f(s)$ is a function that decreases rapidly with respect to the scalar variable s>0. The following is one desirable selection.

$$f(s|f_0, d_0) = f_0 \exp\left(-\frac{s}{d_0}\right) \quad \text{Equation 6}$$

Here $f_0$ and $d_0$ are parameters. By using this potential function, the energy score of the variable $x_i$ can be calculated as follows:

$$e^i = \sum_{j=1}^{P} f(s_{i,j}|f_0, d_0) \quad \text{Equation 7}$$

$$s_{i,j} = \|z_i - z_j\|$$

Calculation of the Degree of Correlation Anomalies

Calculate beforehand the energy score of the system when it operates normally and represent the score as $\{e^-_i|i=1,\ldots p\}$. Calculate the energy value with Equation 7 with respect to the data set to be diagnosed. $e_i$ is a so-called microcosm of a situation relative to $x_i$.

$$\xi_1 = |e_{i-ei}^-| \quad \text{Equation 8}$$

Therefore, the degree of high anomalies is allocated to the variable of which the energy value has changed considerably in comparison with at normal times.

As illustrated FIG. 1, the above-described techniques have been integrated into a software system 100. As shown in FIG. 1, a target (T) data file 105, a reference (R) data file 110, and a variable definition data file 115, are imported via the data importing component 120. Within aspects of the present invention variable definition data files 115 contain information pertaining to the variables (e.g., variable names, units, specific binary attributes, etc.). Further, the inputted target and reference data is parsed at a parsing component 125, similarly, the variable definition data is parsed at a variable definition parsing component 130. Next, the inputted data and variable definition information is transmitted to the data analysis engine 135 for further processing in accordance with aspects of the present invention.

The data analysis engine 135 compiles the resulting diagnostic information and generates a diagnostic analysis file 155, wherein the diagnostic analysis file comprises information in regard to the resultant degree of correlation anomalies that exist within the input variable data. The resulting diagnostic information is also transmitted to a visualization component 145, wherein the visualization component generates a histogram that is based upon the resulting analytical data. The histogram is utilized to provide visual details to a system operator in regard to the determined degree of anomalies that has occurred between the respective energy values.

Figure 2:
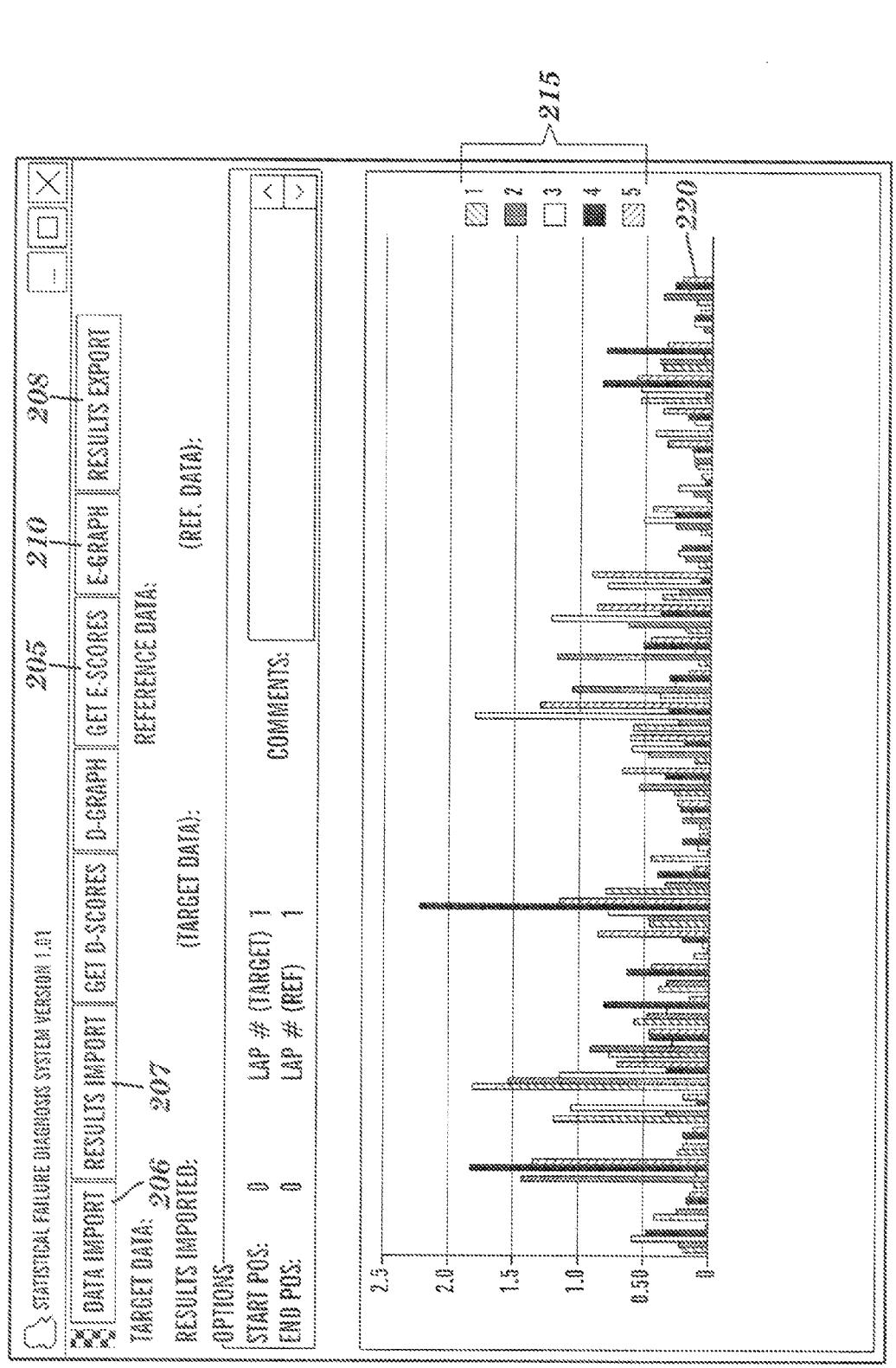
FIG. 2 illustrates one example of a screenshot of a GUI display of an analysis that has been performed within embodiments of the present invention.

FIG. 2 shows a screenshot of a GUI 200 of a correlation anomaly analysis system that may be implemented within aspects of the present invention. E-score (energy score) 205, and E-graph (energy graph) 210 tabs comprised within the GUI 200 relate to analytical aspects of the present invention. The GUI 200 additionally comprises tabs that correlate to the functional operations of data importing 206, results importing 207, and results exporting 208. Further illustrated in FIG. 2, five generalized correlation matrices 220 are employed to illustrate respective visual similarity matrices. The correlation coefficients of discretionary pairs of variables are divided into five classes 215 by symmetric property, and, because the five classes 215 are the upper limit of the classification, it is most desirable to use them.

The capabilities of the present invention can be implemented in software firmware, or some combination thereof.

Additionally, at least one program storage device readable by a machine, tangibly embodying at least one program of instructions executable by the machine to perform the capabilities of the present invention can be provided.

While the preferred embodiment to the invention has been described, it will be understood that those skilled in the art, both now and in the future, may make various improvements and enhancements which fall within the scope of the claims which follows. These claims should be constructed to maintain the proper protection for the invention first described.

What is claimed is:

1. A system for the calculation of variable correlation anomalies based upon multiple correlation variables, the system further comprising:

a data import component, wherein the data import component is configured to receive target data files, reference data files, and variable definition data files;

a data parsing component, wherein the data parser component is configured to parse target input data that is retrieved from a target input data file, and reference input data that is retrieved from a reference input data file;

a variable definition parser component, wherein the variable definition parser component is configured to parse variable definition input data that is retrieved from a variable input data file;

a data analysis engine, wherein the data analysis engine is configured to perform the steps of:

calculating a similarity matrix for a set of variables for the reference input data and the target input data;

mapping the similarity matrices to a low-dimensional vector space in order to calculate a coordinate value for each variable that is comprised within a reference input data matrix and a target input data matrix;

calculating an energy value per variable for each coordinate calculated value comprises within the reference input data matrix and the target input data matrix;

comparing the calculated energy values derived from the reference input value matrix and the target input value matrix in order to determine the degree of anomalies between the respective energy values;

generating a resultant diagnostic analysis file, wherein the file comprises information in regard to the resultant degree of correlation anomalies that exist between the target input value matrix and the reference input value matrix; and a visualization component, wherein the visualization component generates a histogram, the histogram providing visual details in regard to the determined degree of anomalies between the respective energy values.

2. The system of claim 1, wherein a GUI in communication with the visualization component retrieves and displays the generated histogram of the determined degree of anomalies between the respective energy values.

3. The system of claim 2, wherein the variable definition input data comprises variable nomenclature, variable unit amounts, and variable binary attributes.

4. The system of claim 2, wherein the data analysis engine is further configured to import and export data that is comprised within the resultant diagnostic analysis file.

5. A method for the calculation of variable correlation anomalies based upon multiple correlation variables, the method further consisting of the steps of:

receiving target data files, reference data files, and variable definition data files at a data import component;

parsing the target input data that is retrieved from the target input data file, and the reference input data that is retrieved from the reference input data file at a data parsing component;

parsing variable definition input data that is retrieved from the variable input data file at a variable definition parser component;

calculating a similarity matrix for a set of variables for the reference input data and the target input data;

mapping the similarity matrices to a low-dimensional vector space in order to calculate a coordinate value for each variable that is comprised within a reference input data matrix and a target input data matrix;

calculating an energy value per variable for each coordinate calculated value comprised within the reference input data matrix and the target input data matrix;

comparing the calculated energy values derived from the reference input value matrix and the target input value matrix in order to determine the degree of anomalies between the respective energy values;

generating a resultant diagnostic analysis file, wherein the file comprises information in regard to the resultant degree of correlation anomalies that exist between the target input value matrix and the reference input value matrix; and generating a histogram, the histogram providing visual details in regard to the determined degree of anomalies between the respective energy values.

* * * * *